United States Patent [19]

Nagasawa

[11] Patent Number: 4,665,535
[45] Date of Patent: May 12, 1987

[54] CODE REGENERATIVE SYSTEM

[75] Inventor: Satoshi Nagasawa, Mobara, Japan

[73] Assignee: Futaba Denshi Kogyo Kabushiki Kaisha, Mobara, Japan

[21] Appl. No.: 774,734

[22] Filed: Sep. 11, 1985

[30] Foreign Application Priority Data

Sep. 13, 1984 [JP] Japan .................................. 59-192359

[51] Int. Cl.⁴ .............................................. H03D 3/24
[52] U.S. Cl. .................................... 375/120; 307/269; 328/164
[58] Field of Search ...................... 375/81, 82, 97, 120; 307/269; 328/164; 329/107, 110, 122, 126

[56] References Cited

U.S. PATENT DOCUMENTS

| | | | |
|---|---|---|---|
| 4,320,515 | 3/1982 | Burton, Jr. | 307/269 |
| 4,380,815 | 4/1983 | Clendening | 375/120 |
| 4,429,406 | 1/1984 | Hale | 375/94 |
| 4,516,079 | 5/1985 | York | 329/110 |
| 4,535,459 | 8/1985 | Hogge, Jr. | 375/80 |

Primary Examiner—Robert L. Griffin
Assistant Examiner—Stephen Chin
Attorney, Agent, or Firm—Oblon, Fisher, Spivak, McClelland & Maier

[57] ABSTRACT

A code regenerative system is disclosed which is capable of increasing a noise resistant property of code transmission to improve a bit error rate, to thereby accomplish code transmission substantially free of an error without degrading the transmission efficiency. The system comprises a clock pulse regenerative section for stably regenerating a clock pulse train from an input pulse train and a code regenerative section for integrating an input pulse every regenerative clock pulse only for a code discrimination term to carry out the comparison between an integration signal obtained and a reference voltage, to thereby generate a regenerative code.

6 Claims, 17 Drawing Figures

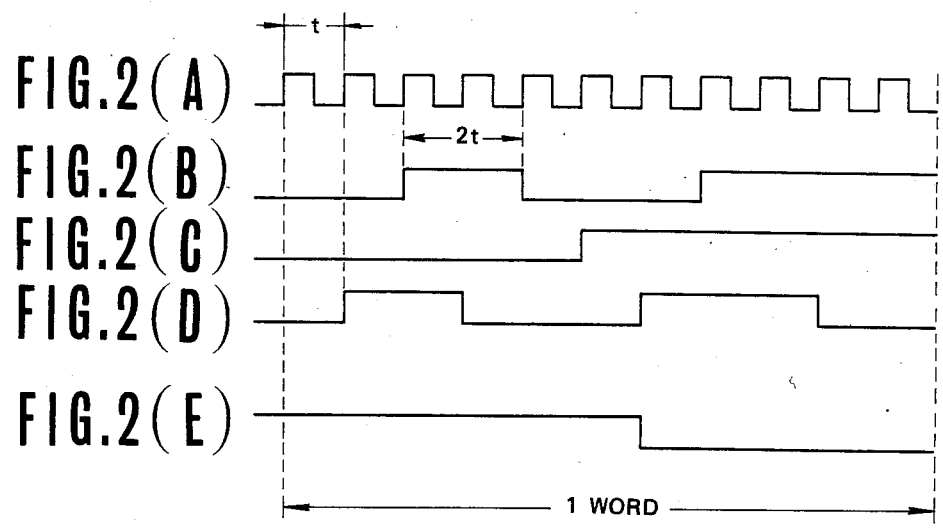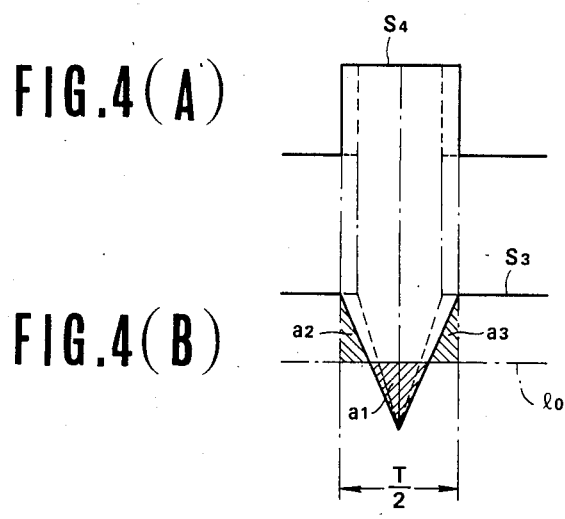

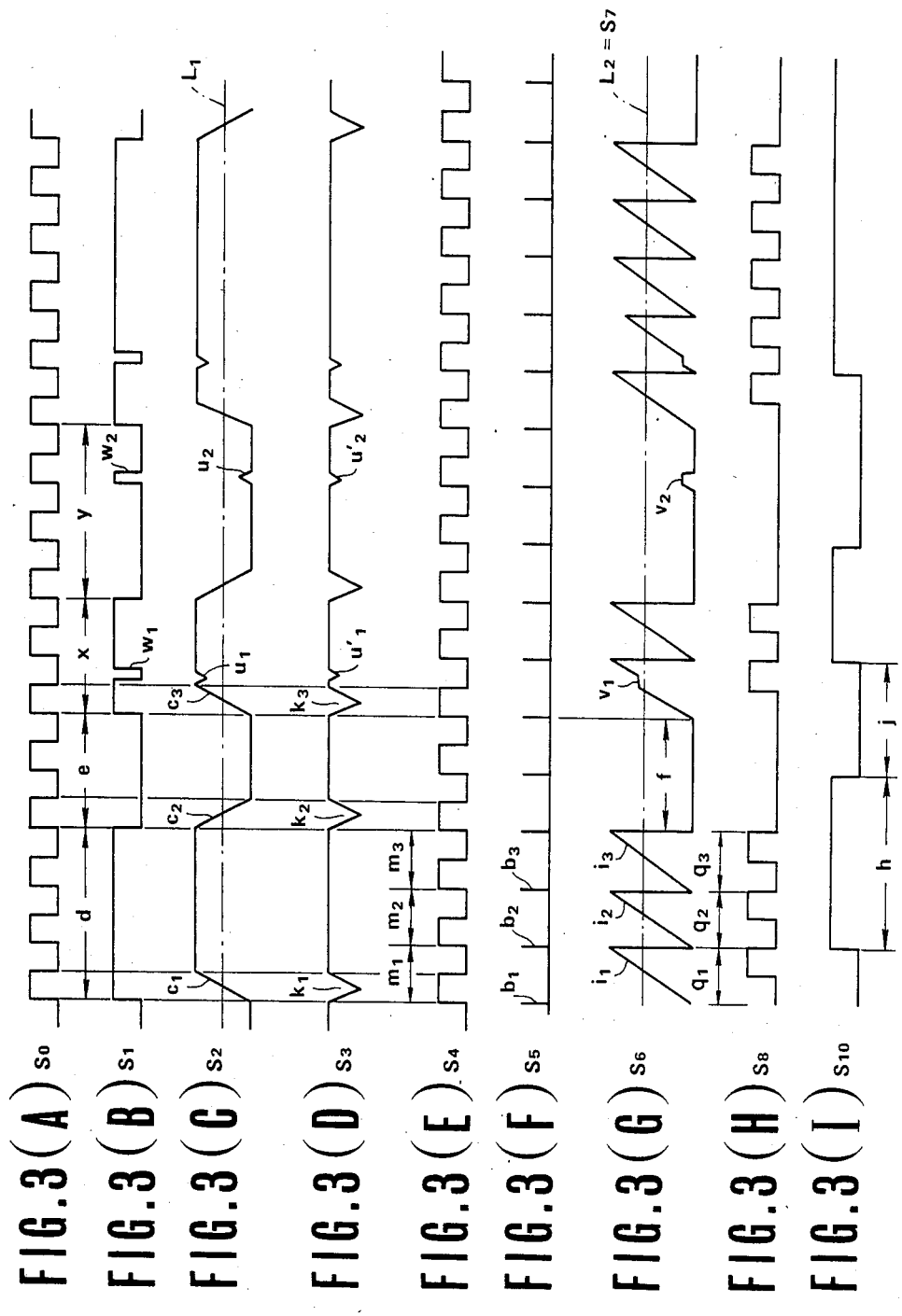

CODE REGENERATIVE SYSTEM

BACKGROUND OF THE INVENTION

1. Field of the Invention

This invention relates to a code regenerative system adapted to constitute a data communicating system mainly using a radio circuit and constructed to receive a binary code (a code representing "1" or "0") supplied in a series manner with respect to time from a transmission side and regenerate at a reception side a regenerative code synonymous with the code supplied from the transmission side according to a time base for the serializing of the code. More particularly, this invention relates to a code regenerative system which is capable of increasing a noise resistant property with respect to an electric noise in a radio circuit to improve the error rate of a code (hereinafter referred to as "bit error rate").

2. Description of the Prior Art

An improvement in bit error rate of a character or a sentence transmitted by means of a code has been conventionally carried out utilizing various steps including an error detection such as a parity check or the like, an error correction using a cyclic code, and the like.

Such a conventional step is adapted to introduce an unused lengthy code into a code system to increase a distance between a code representing a data to be transmitted and a code representing another data in proximity to the former data. Accordingly, when any error generates in a code, the code having the error constitutes a non-use lengthy code unless the amount of movement of the code due to the error is equal to the distance between the codes. Thus, the conventional steps require to discriminate the unused lengthy code every predetermined check interval or block to carry out an error check, followed by removing the block having an error code or converting the lengthy code into a non-lengthy code at the shortest code distance from the lengthy code to carry out the correction.

Thus, the error check in the prior art has a disadvantage of causing codes having an error to be screened out every check block, to thereby degrade transmission efficiency or a ratio of the number of codes which transferred correct data to the total number of codes transmitted. On the other hand, the error correction in the prior art also has a disadvantage of increasing the number of codes necessary for the error correction (codes unconcerned in the transfer of data), because of requiring to render the above-noted code distance substantially large, to thereby cause the transmission efficiency or a ratio of the number of codes concerned in the transfer of data to the total number of codes transmitted to be substantially reduced.

It should be noted that such disadvantages of the prior art are inevitably caused due to the fact that the prior art considers only an ex post facto remedy on the assumption of generaton of bit error and fails to reach an idea of reducing the probability of occurrence of a bit error itself.

SUMMARY OF THE INVENTION

The present invention has been made in view of the foregoing disadvantages of the prior art that the transmission efficiency is substantially degraded and while taking notice of the fact that the above-noted disadvantages of the prior art can be effectively eliminated by providing clock pulse regenerative means for stably regenerating a clock pulse train from an input pulse train and code regenerative means for integrating an input pulse every regenerative clock pulse only for a code discrimination term or a pulse duration of the input pulse existing to represent one state of a binary code in the input pulse train to carry out the comparison between integration signal thus obtained and a reference voltage, to thereby generate a regenerative code based on the comparison.

Such a construction allows a noise resistant property of code transmission to be increased to directly improve a bit error rate, to realize code transmission substantially free of an error without deteriorating transfer efficiency.

Accordingly, it is an object of the present invention to provide a code regenerative system which is capable of increasing a noise resistant property of code transmission to improve a bit error rate, to thereby accomplish code transmission substantially free of an error without degrading the transmission efficiency.

It is another object of the present invention to provide a code regenerative system which is capable of improving a bit error rate itself even under highly noisy circumstances in which an input pulse train accompanies an inversion slit having a small pulse width to accomplish data transmission of high quality without deteriorating transmission efficiency.

It is a further object of the present invention to provide a code regenerative system which is capable of regenerating a clock pulse having a stable and effective synchronized relationship to an input pulse train without being affected by an inversion slit contained in the input pulse train.

It is a still further object of the present invention to provide a code regenerative system which is capable of effectively discriminating the presence or absence of each pulse in an input pulse train even under highly noisy circumstances.

Generally speaking with reference to FIG. 1, a code regenerative system in accordance with the present invention comprises clock pulse regenerative means 1 which is adapted to response to an input pulse train $S_1$ as a transmission code. The clock pulse regenerative means 1 includes a shapng circuit 2 which serves to integrate the input pulse train $S_1$ every pulse and clip the peak portion of the integrated output to form a shaping signal $S_2$ to be output, a rectification circuit 3 connected to the shaping circuit 2 and acting to subjecting the shaping signal $S_2$ output from the shaping circuit 2 to full wave rectification based on a predetermined set level $L_1$ serving as a reference level to generate a rectification signal $S_3$, and a PLL circuit 4 for extracting a phase comparison signal in proximity to the cross point between the rectification signal $S_2$ and the predetermined set level $L_1$ in response to the rectification signal $S_3$ to generate a clock pulse train $S_4$ of which a phase is varied depending upon the phase comparison signal. The code regenerative system of the present invention further comprises code regenerative means 5 which includes first switch means 7 adapted to operate depending upon the presence or absence of each pulse in the input pulse train $S_1$ to intermittently actuate a code integrator 8 connected thereto, to thereby cause the integrator 8 to generate an integral signal $S_6$; second switch means 9 adapted to operate in response to each pulse in the clock pulse train $S_4$ supplied from the clock pulse regenerative means 1 to cause the code integrator 8 to repeatedly carry out the integration operation every interval during which the first switch means 7 is turned on and the second switch means 9 is turned off or over a period of time during which the input pulse train $S_1$ is discriminated and restrain the code integrator 8 to a return state irrespective of the second switch means 9 for a period of time during which the first switch means is turned off or for a period of time other than that during which the input pulse train is discriminated to distinguish the integration signal $S_6$; a comparator 11 adapted to carry out the comparison between the integral signal $S_6$ and a predetermined reference voltage $S_7$ to generate a comparison signal $S_8$; and a converter 12 connected to the comparator 11 and adapted to generate a regenerative code representing each state of a binary code based on the comparison signal $S_8$ and the clock pulse train $S_4$ supplied from the clock pulse regenerative means 1, to thereby carry out the discrimination of each state of the binary signal.

In accordance with the present invention, there is provided a code regenerative system comprising clock pulse regenerative means for regenerating a clock pulse train in synchronism with an input pulse train representing a binary code in response to the input pulse train; and code regenerative means for discriminating the state of the binary code depending upon the presence or absence of each pulse in the input pulse train in response to the input pulse train to generate a regenerative code. The clock pulse regenerative means includes a wave shaping circuit for integrating the input pulse train to produce an integration output every pulse and outputting a shaping signal formed by clipping the peak portion of the integration output, a rectification circuit for outputting a rectification signal formed by subjecting the shaping signal to full wave rectification based on a set level predetermined as a reference level and a phase lock loop for detecting a phase in proximity to the cross point between the shaping signal and the set level to output a pulse train of which a phase is varied depending upon the detected phase as a clock pulse train. The code regenerative means includes a first switch means operating depending upon the presence or absence of each pulse in the input pulse train, a second switch means operating in response to each pulse in the clock pulse train output from the clock pulse regenerative means, a code integration circuit adapted to continue the integration operation to output an integration signal for a period of time during which the first switch means is turned on and be restrained to the return state at the time when the second swtich means is turned on, a comparator for carrying out the comparison between the integration signal output from the code integration circuit and a predetermined reference voltage to output a comparison signal, and a converter for outputting a regenerative signal representing each state of the binary signal based on the comparison signal from the comparator and the clock pulse train from the clock pulse regenerative means.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters designate like or corresponding parts throughout, wherein

FIG. 2 is a wave form wherein FIG. 2(A) shows the portion of a clock pulse train for one work on a transmission side, FIG. 2(B) shows a first code in which the portion of a clock pulse in one work for two bits discriminates "1" as an input data, FIG. 2(C) shows a second code in which the characteristic moment only once appears in one word, FIG. 2(D) shows in which "1" appears as an input data in a manner that only the portion of a clock pulse in one word for one bit is delayed, and FIG. 2(E) shows a fourth code having a characteristic moment in the direction opposite to the second code;

FIG. 3 is a wave form wherein FIG. 3(A) shows a clock pulse on a transmission side, FIG. 3(B) shows an input pulse train containing an inversion slit on a receiving side, FIG. 3(C) shows a shaping signal output from a shaping circuit of clock regenerative means, FIG. 3(D) shows a rectification signal from the shaping circuit, FIG. 3(E) shows a clock pulse train regenerated on a receiving side, FIG. 3(F) shows a differentiation signal output from a differentiation circuit of code regenerative means, FIG. 3(G) shows an integration signal output from a code integration circuit, FIG. 3(H) shows a comparison signal output from a comparator and FIG. 3(I) shows a regenerative code output from a converter; and FIG. 4 is a wave form showing the operation of a PLL circuit wherein FIG. 4(A) shows a clock pulse train FIG. 4(B) shows a rectification signal of a wedge shape.

DETAILED DESCRIPTION OF THE PREFERRED EMBODIMENTS

Figure 1:
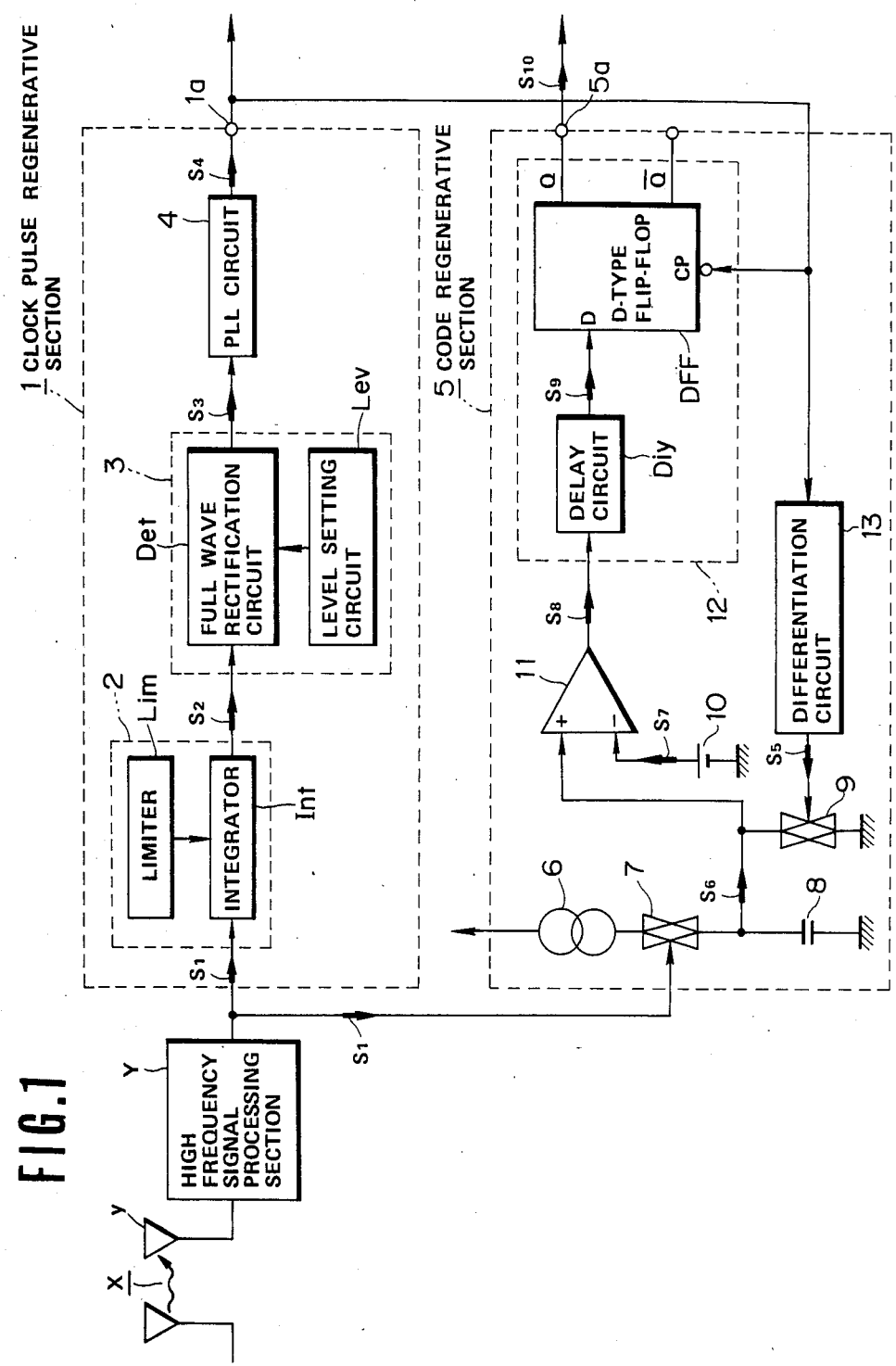
FIG. 1 is a block diagram showing an embodiment of a code regenerative system according to the present invention.

Now, a code regenerative system according to the present invention will be described hereinafter with reference to the accompanying drawings.

As shown in FIG. 1, a code regenerative system of the illustrated embodiment includes a clock pulse regenerative section 1 which comprises a shaping circuit 2 constituted by an integrator Int having a limiter Lim acting as a part of a feedback circuit, a rectification circuit 3 connected to the shaping circuit 2 and constituted by a full wave rectification circuit Det including a level setting circuit Lev, and a Pll circuit 4 connected to the rectification circuit 3 and adapted to regenerate a clock pulse train. The PLL circuit 4 has an output terminal led out through an outlet terminal 1a of the clock pulse regenerative section 1.

The integrator Int of the shaping circuit 2 is connected to an output terminal of a high frequency signal processing section Y connected to a receiving antenna y provided at the receiving end of a radio circuit X.

The high frequency signal processing circuit Y comprises signal processing means known in the art which includes a tuning circuit, a detection circuit, a limiter circuit and a demodulation circuit.

The code regenerative system of the illustrated embodiment also includes a code regenerative section 5 which comprises an analog switch 7 connected in series between a constant current source 6 and a ground and a capacitor 8 acting as a code integrator, an analog switch 9 connected between one end of the capacitor 8 and a ground, a comparator 11 having a uninverted input terminal connected to the one end of the capacitor 8 and an inverted input terminal connected to a reference voltage source 10, and a converter 12 constituted by a delay circuit Dly and a D-type flip-flop DFF. The analog switch 7 has a control terminal connected to the output terminal of the high frequency signal processing section Y and the analog switch 9 has a control terminal connected through a differentiation circuit 13 to the output terminal 1a of the clock pulse regenerative section or means 1. Also, the D-type flip-flop DFF has an input terminal connected to an output terminal of the delay circuit Dly, of which a clock terminal is connected to the output terminal 1a of the clock pulse regenerative means 1.

Now, the manner of operation of the code regenerative system of the illustrated embodiment constructed as described above will be described hereinafter with reference to FIGS. 1 to 4.

A radio wave on the radio circuit X is received through the receiving antenna y by the high frequency signal processing section Y, which subjects the wave to conventional signal processing procedures such as tuning, detection, demodulation and the like therein to carry out the demodulation of modulation made in a wave on the radio circuit or a main carrier. As a result, the high frequency signal processing section Y supplies an input pulse train $S_1$ representing a series of codes through a transmission system to the control terminal of the analog switch 7 and the integrator Int.

A series of such codes are obtained by conversion carried out at a transmission end (not shown) of the transmission system according to a time base defined by a clock pulse train $S_0$ as shown in FIG. 2A. For example, such four codes are illustrated in FIGS. 2B to 2E which are obtained under noiseless circumstances.

Features common to these codes are that (1) a term or period of time allotted for the transmission of one word is fixed to a predetermined value, for example, that for eleven bits in the clock pulse train, (2) there are appeared one or more characteristic moments in one word, and (3) a term for code discrimination appeared in one word is predetermined, for example, to have a term 2t for two bits in the clock pulse train as a minimum unit.

Assuming that the input code received under such noiseless circumstances is defined by the input pulse train $S_1$ (FIG. 3B) based on the clock pulse train $S_0$ (FIG. 3A) on the transmission side, the integrator Int of the shaping circuit 2 carries out the integration operation for the code discriminating term indicated at d in FIG. 3B, during which the limiter Lim attached to the integrator Int clips the upper and lower peak portions of an integration output of the integrator, to thereby allow a shaping signal $S_2$ as shown in FIG. 3C to be obtained. The shaping signal $S_2$ is rectified by the full wave rectification circuit Det of the rectification circuit 3. At this time, when a predetermined set level $L_1$ supplied from the level setting circuit Lev attached to the full wave rectification circuit Det is set, for example, so as to proportionally divide the wave form of the shaping signal $S_2$ in a vertically symmetrical manner, a rectification signal $S_3$ having a shape vertically folded with respect to the level $L_1$ as shown in FIG. 3D is obtained of which a wave form has dip portions $K_1$, $K_2$, $K_3$—at positions corresponding to the cross points $C$, $C_2$, $C_3$—between the shaping signal $S_2$ and the set level $L_1$.

Then, when the rectification signal $S_3$ is supplied to the PLL circuit 4, the PLL circuit 4 continuously detects the dip portions $K_1$, $K_2$, $K_3$—as shown in FIGS. 4A and 4B to allow the dip portions to form a certain type of phase comparison signal of which the half cycle $T/2$ is defined to allow the area of each dip K on the side positive thereof with respect to a predetermined level $l_0$ acting as a criteria to equal to that on the negative side thereof, more particularly, as area $a_1$ on the positive side to equal to an area $a_2 + a_3$ on the negative side in FIG. 4B and generates a pulse train of a cycle T following a cycle t of the clock pulse train (FIG. 3A) on the transmission side utilizing the fact that the phase comparison signal varies depending upon the shape of the dip portions $K_1$, $K_2$, $K_3$ ---, the pulse train thus generated acting as a clock pulse train $S_4$.

In this instance, when the correlation between the input pulse train $S_1$ and the clock pulse train $S_4$ is instantly disturbed, for example, to cause the area of the dip portion on the negative side below the predetermined level $l_0$ to be reduced as indicated in dotted lines in FIG. 4B, the half cycle $T/2$ of the phase comparison signal is varied to be reduced as indicated in dotted lines in FIG. 4A to cause the area of the dip portion on the positive side to be reduced corresponding to the reduction of area on the negative side. On the contrary, when the area on the negative side below the level $l_0$ is increased, the half cycle $T/2$ of the phase comparison signal is correspondingly increased. Thus, the difference between the negative side area and the positive side area of the dip portion produced from the input pulse train $S_1$ or the difference between the phase of the clock pulse train $S_4$ on the transmission side and that of the clock pulse train $S_4$ on the receiving side is constantly reduced so that the clock pulse train $S_4$ may be generated as a wave form having the closest correlation to the clock pulse train on the transmission side and a time base for determining the code discrimination term of the input pulse train may be reproduced.

The analog switch 7 forming a part of the code regenerative means 5 operates in response to the input pulse train $S_1$ supplied to the control terminal thereof, whereas to the control terminal of the other analog switch 9 is supplied a differentiation signal $S_5$ (FIG. 3F) catching a characteristic moment directing toward, for example, "1" of the clock pulse train and the analog switch 9 operates corresponding thereto.

For example, during a term for one bit of the clock pulse train $S_4$ ($m_1$ in FIG. 3(E)), the analog switch 9 is instantly turned on due to a differentiation pulse $b_1$ to cause the capacitor 8 to be instantly discharged so that the capacitor 8 may be then allowed to carry out the integration operation. In this instance, the analog switch 7 is turned on, because the term corresponds to the code discrimination term of the input pulse train and the terminal voltage across the capacitor 8 or an integration signal $S_6$ is linearly increased ($i_1$ in FIG. 3(G)).

Then, when a term for the next one bit ($m_2$ in FIG. 3(E)) subsequent to the above-described one bit term starts, a differentiation pulse $b_2$ is generated, resulting in the analog switch 9 being instantly turned on to cause the capacitor 8 to discharge. Also, in this instance, the term is included in the code discrimination term of the input pulse train to allow the capacitor 8 to carry out the integration operation so that an integration signal $S_6$ indicated at $i_2$ in FIG. 3(G) may be formed until the generation of a differentiation pulse $b_3$ in the subsequent bit term ($m_3$ in FIG. 3(E)).

Such integration operation is repeated while the discrimination term of one code of the input pulse train $S_1$ continues ($i_3$ in FIG. 3(G)). The comparator 11 to which the integration signal $S_6$ is supplied carries out the comparison in magnitude between the integration signal and a reference voltage $S_7$, and supplies a comparison signal $S_8$ inverting from "0" to "1" from the output terminal thereof to the converter 12. It is of course that the cycle of the comparison signal $S_8$ is the same as that of the integration signal $S_6$ ($q_1$, $q_2$, $q_3$ in FIG. 3(H)).

The comparison signal $S_8$ is somewhat delayed by the delay circuit Dly of the converter 12 to be supplied to the D-type flip-flop DFF as an input signal $S_9$. At this time, the D-type flip-flop DFF has a regenerative clock pulse train $S_4$ supplied to a clock terminal CP thereof. Thus, an output signal representing the state of the input signal $S_9$ immediately before the arrival of the clock pulse is obtained at a positive phase output terminal Q of the flip-flop DFF every arrival of the clock pulse. The output signal supplied from the output terminal Q is delayed by the one bit term of the clock pulse train $S_4$ to form a regenerative signal $S'_{10}$ obtained by regenerating "1" of the input pulse train $S_1$ (h in FIG. 3(I)).

Besides, during a rest period (e in FIG. 3(B)) subsequent to the code discrimination period (d in FIG. 3(B)), the analog switch 7 is caused to be turned off to fail the charging of the capacitor 8 from the constant current source 6, which makes the terminal voltage across the capacitor 8 to be equivalent to an earth potential irrespective of the condition of the analog switch 9, and it may be restrained to the return state.

This results in the regenerative code $S_7$ remaining at "0" during the rest term as indicated at j in FIG. 3(I).

In general, there exists a noise in a transmission system. Particularly, a radio circuit is affected by an external impulse noise, such as, for example, an ignition noise or the like derived from spark discharge in an internal combustion engine to cause a main carrier to fall into an instant turn-off state. Thus, the input pulse train $S_1$ obtained at the high frequency signal processing section Y provided on the receiving side accompanies an undesired inversion slit, of which a wave form is illustrated as one example in FIG. 3(B).

In FIG. 3(B), during the code discrimination term (x in FIG. 3(B)) during which the state of a code is to be kept at "1", an inversion slit having a relatively small pulse width which is inverted into the state of a code state at "0" ($w_1$ in FIG. 3(B) is generated. On the other hand, during the code rest term (y in FIG. 3(B)), an inversion slit which is inverted into a code state of "1" ($w_2$ in FIG. 3(B)) is generated.

It is empirically known that most of such inversion slits have a pulse width of 10–30 μsec. The degree that the inversion slit affects the input pulse train is about 1/40, because, supposing that the frequency of the clock pulse train is selected to be 1 kHz, the minimum unit of the code discrimination term is one bit of each pulse or 1 msec.

In the light of the foregoing, an influence of the inversion slit on the regenerative clock pulse and regenerative code in the illustrated embodiment will be considered hereinafter.

As indicated at $w_1$ in FIG. 3(B), an inversion slit appearing while the input pulse train $S_1$ remains at "1" interrupts the integration operation of the integrator Int in the shaping circuit 2 only during a term of the slit width, resulting in a defect occurring in the wave forms of the shaping signal $S_2$ and rectification signal $S_3$ as indicated at $u_1$ in FIG. 3(C) and $u_1'$ FIG. 3(D). In this instance, a term during which the inversion slit continues is too short as described above to cause the defect $u_1$ to reach the set level $L_1$. Thus, the inversion slit does not affect the clock pulse train $S_4$ (FIG. 3(E)). Also, the capacitor 8 acting as the code integrator interrupts the integration operation during the term of the inversion slit ($v_1$ in FIG. 3(G)), however, the peak value of an integration signal $v_1$ obtained is sufficient to exceed the set valve $L_2$ of the reference voltage $S_7$. Thus, the output of the comparator 11 is not affected by the defects (FIG. 3(H)), and a regenerative code $S_{10}$ is kept at "1" (FIG. 3(I)).

Further, as indicated at $w_2$ in FIG. 3(B), when the inversion slit is superposed on "0" of the input pulse train $S_1$, defects are appears on the wave forms of the shaping signal $S_2$ and rectification signal $S_3$ as indicated at $u_2$ in FIG. 3(C) and $u_2'$ in FIG. 3(D), respectively. However, such defects do not affects the clock pulse train $S_4$ for the reason as described above. Also, an integration signal $v_2$ appears during the return term of the capacitor 8 due to the inversion slit. However, the peak value of the integration signal $v_2$ fails to reach the set value $L_2$ as shown in FIG. 3(G). Accordingly, this does not affect the comparison signal $S_8$ of the comparator (FIG. 3(H)), the thereby cause a regenerative code $S_0$ to remain at "0" (FIG. 3(I)).

Thus, even when the inversion slit appears during the code discrimination term of the input pulse train $S_1$ or the other term thereof, it does not affect the regenerative clock pulse or regenerative code, to thereby stably and effectively accomplish the code regeneration.

As can be seen from the foregoing, the present invention is constructed in the manner that, during the discrimination of presence or absence of each pulse in the input pulse train, the clock pulse in synchronism with the input pulse train is regenerated through the integration of the input pulse and the subsequent rectification processing, and the integration of the input pulse is carried out every one bit of each clock pulse over the code discrimination term defined by the regenerative clock pulse so that the comparison between the integrated valve and the predetermined reference voltage may be carried out. Accordingly, the present invention has an advantage of improving a bit error itself even under highly noisy circumstances wherein the input pulse train accompanies an inversion slit having a small pulse width, which makes it possible to carry out data transmission with high quality without degrading transmission efficiency.

Also, the present invention is constructed to obtain the phase comparison signal from the input pulse train to carry out the phase control of the output signal from the PLL circuit or regenerative clock pulse. Accordingly, the regeneration of the clock pulse having a stable and positive synchronized relationship to the input pulse train may be accomplished without being affected by the inversion slit accompanied in the input pulse train.

Further, the present invention is constructed to compare the integration signal obtained as an integration value over the code discrimination term of each pulse in the input pulse train to the predetermined reference voltage. Such construction of the present invention, in the discrimination of presence of each pulse in the input pulse train, permits the integration signal to be considerably increased at the end of the code discrimination term even when the input pulse train accompanies the inversion slit having a small pulse width which directs toward "0". Also, the construction, in the discrimination of absence of a pulse in the input pulse train, allows the integration signal at the end of the code discrimination term to be suppressed to a considerably small value even when the input pulse train contains the inversion slit having a small pulse width which directs toward "1". Thus, the present invention can stably and effectively discriminate the presence or absence of each pulse in the input pulse train even under high noisy circumstances.

While a preferred embodiment of the invention has been described with a certain degree of particularlity with reference to the drawings, obvious modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. A code regenerative system comprising:
   (a) clock pulse regenerative means for regenerating a clock pulse train in synchronism with an input pulse train representing a binary code in response to said input pulse train, said clock pulse regenerative means:
      (i) having a wave shaping circuit for integrating said input pulse train to produce an integration output every pulse and outputting a shaping signal formed by clipping the peak portion of said integration output;
      (ii) having a rectification circuit for outputting a rectification signal formed by subjecting said shaping signal to full wave rectification based on a set level predetermined as a reference level; and
      (ii) having a phase lock loop receiving the rectification signal for detecting a phase in proximity to the cross point between said shaping signal and said set level to output a pulse train of which a phase is varied depending upon said detected phase as a clock pulse train; and
   (b) code regenerative means for discriminating the state of said binary code depending upon the presence or absence of each pulse in said input pulse train in response to said input pulse train to generate a regenerative code, said code regenerative means:
      (i) having a first switch means operating depending upon the presence or absence of each pulse in said input pulse train;
      (ii) having a second switch means operated in response to each pulse in said clock pulse train output from said clock pulse regenerative means;
      (iii) having a code integration circuit adapted to continue the integration operation to output an integration signal for a period of time during which said first switch means is turned on and be restrained to the return state at the time when said second switch means is turned on;
      (iv) having a comparator for carrying out the comparison between said integration signal output from said code integration circuit and a predetermined reference voltage to output a comparison signal; and
      (v) having a converter for outputting a regenerative signal representing each state of said binary signal based on said comparison signal from said comparator and said clock pulse train from said clock pulse regenerative means 2. The code regenerative system as defined in claim 1, wherein said wave shaping circuit comprises an integrator and a limiter.

3. The code regenerative system as defined in claim 1, wherein said rectification circuit comprises a full wave rectification circuit having a level setting circuit.

4. The code regenerative system as defined in claim 1 further comprising a high frequency signal processing section for supplying an input pulse train representing a series of codes through a transmission system to said first switch means and said integrator.

5. The code regenerative system as defined in claim 1, wherein said code regenerative means further includes a differentiation circuit connected to a control terminal of said second switch means and an output terminal of said clock pulse regenerative means.

6. The code regenerative system as defined in claim 1, wherein said converter comprises a delay circuit and a D-type flip-flop, an input terminal of said D-type flip-flop being connected to an output terminal of said delay circuit and a clock terminal of said D-type flip-flop being connected to an output terminal of said clock pulse regenerative means.

* * * * *